(12) United States Patent
Foxenland

(10) Patent No.: US 8,744,056 B2
(45) Date of Patent: Jun. 3, 2014

(54) COMMUNICATION IDENTIFIER LIST CONFIGURATION

(75) Inventor: Eral Denis Foxenland, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2900 days.

(21) Appl. No.: 11/278,582

(22) Filed: Apr. 4, 2006

(65) Prior Publication Data

US 2007/0263843 A1    Nov. 15, 2007

(51) Int. Cl.
*H04M 3/42*        (2006.01)

(52) U.S. Cl.
USPC .............................. 379/201.04; 379/201.01

(58) Field of Classification Search
USPC ........... 379/188, 356, 142, 355; 455/414, 550
See application file for complete search history.

(56) References Cited

U.S. PATENT DOCUMENTS

| | | | | |
|---|---|---|---|---|
| 6,084,954 | A * | 7/2000 | Harless et al. ................ | 379/140 |
| 7,215,881 | B2 * | 5/2007 | Borngraber et al. ............ | 396/15 |
| 7,280,652 | B2 * | 10/2007 | Bocking et al. .......... | 379/355.02 |
| 2004/0192270 | A1 * | 9/2004 | Kreitzer ...................... | 455/414.1 |
| 2007/0064908 | A1 * | 3/2007 | Levy et al. ............... | 379/211.03 |

FOREIGN PATENT DOCUMENTS

| | | |
|---|---|---|
| EP | 0 930 761 | 7/1999 |
| GB | 2 354 134 | 3/2001 |
| JP | 2000-358049 A | 12/2000 |
| JP | 2003-298751 A | 10/2003 |
| WO | WO 2004/095206 | 11/2004 |

OTHER PUBLICATIONS

PCT Search Report and Written Opinion, Mar. 15, 2007, 11 pages.
International Preliminary Report on Patentability dated Jul. 18, 2008, issued in corresponding international application No. PCT/IB2006/053637, 6 pages.

* cited by examiner

*Primary Examiner* — Amal Zenati
(74) *Attorney, Agent, or Firm* — Snyder, Clark, Lesch & Chung, LLP

(57) ABSTRACT

A device is provided that may initiate a communication with a communication device; log the communications initiated with respective communication devices; determine a likelihood that any one of the communication devices will be a next communication device with which communication will be initiated based on the logged information; and order, in a displayable list based on the determined likelihoods, identifiers associated with at least two of the communication devices.

22 Claims, 11 Drawing Sheets

COMMUNICATION IDENTIFIER LIST CONFIGURATION

TECHNICAL FIELD OF THE INVENTION

Implementations described herein relate generally to electronic devices, and more particularly, to operations that may be associated with communication devices.

DESCRIPTION OF RELATED ART

Communication devices, such as mobile terminals, may be used by individuals for communicating with users of other communication devices. For example, a communication device may be used to place/receive calls and send/receive text messages to/from other communication devices having unique identifiers, e.g., phone numbers. The communication device may generate and maintain a log of the phone numbers identifying the communication devices with which the communication device communicates.

The phone number logs may be used to form displayable call lists such as "recent calls," "missed calls," "dialed calls," and "received calls." A displayed phone number may be dialed from the communication device, for instance, by scrolling the call list to the desired phone number, and then activating a single "call" or "send" key. Thus, the call list functions as a phone number directory, and the send key offers a simplified alternative to individually entering the digits of the phone number of the recipient.

A user-friendly feature of communication device typically includes providing a list of recent calls as either the default display or the most readily displayable call list which is accessible from a standby mode of the communication device. However, recency is not necessarily the best single predictor of the particular phone number that an individual is most likely to call at any given time from the communication device.

SUMMARY

According to one aspect, a communication device may comprise a memory to store a first call log; logic configured to generate a first call list based on the first call log, the first call list including a first set of party identifiers that are arranged in an order based on call frequency information respectively associated with the party identifiers; and a display to display at least a portion of the first call list.

Additionally, the call frequency information may correspond to at least one of time of day information or day of week information.

Additionally, the communication device may also comprise a calendar to store calendar information, the order being further based on the stored calendar information.

Additionally, the communication device may also comprise a user interface, the displayed party identifiers being selectable via the user interface, the logic being further configured to generate a second call list based on a first selected one of the party identifiers.

Additionally, the second call list may comprise a second set of party identifiers associated with the first selected party identifier.

Additionally, the second set of party identifiers may be ordered based on a degree of association with the first selected party identifier.

Additionally, when a second one of the party identifiers is selected from the second set of party identifiers, the logic may be further configured to place a multi-party call to the first selected party identifier and the second selected party identifier.

Additionally, the first call log and the first call list may correspond to a first user of the communication device, the memory to store a second call log, the logic further configured to generate a second call list based on the second call log, the second call log and the second call list corresponding to a second user of the communication device.

Additionally, the first call log and the first call list may correspond to a first communication identifier associated with the communication device, the memory to store a second call log, the logic further configured to generate a second call list based on the second call log, the second call log and the second call list corresponding to a second communication identifier associated the communication device.

Additionally, the call frequency information may comprise weighted call frequency information based on call recency information.

According to another aspect, a method may be provided. The method may comprise storing communication identifiers associated with respective signals transmitted from a communication device; configuring a list of the stored communication identifiers based on a relative frequency of signal transmission to the respective stored communication identifiers; and displaying at least a portion of the list.

Additionally, the configuring the list may also be based on a time of day of the configuring.

Additionally, the configuring the list may also be based on a day of week on which the list is configured.

Additionally, the method may also comprise calendaring information for a date, wherein the configuring the list is further based on the calendared information associated with the date when the configuring occurs on the date.

Additionally, the method may also comprise receiving a first selection of a displayed communication identifier from the list; reconfiguring the list based on the first selection; and displaying at least a portion of the reconfigured list.

Additionally, the method may also comprise receiving a second selection of a displayed communication identifier from the reconfigured list; and transmitting a signal based on the first selection of the displayed communication identifier and the second selection of the displayed communication identifier.

Additionally, the method may also comprise determining a frequency with which the first selection is included in respective multi-party signal transmissions with two or more of the stored communication identifiers.

Additionally, the configuring the list of the stored communication identifiers may also be based on a relative recency of the signal transmission to the respective stored communication identifiers.

According to yet another aspect, a computer readable medium that stores instructions executable by a processing device operating in a communications terminal may be provided. The computer readable medium may comprise instructions to determine a probability that a communication identifier of a plurality of stored communication identifiers will be selected from the stored communication identifiers for calling; and instructions to order at least two of the stored communication identifiers based on the respective probabilities associated with the at least two communication identifiers.

Additionally, the computer readable medium may also comprise the instructions to display the ordered communication identifiers as a list.

Additionally, the computer readable medium may also comprise instructions to receive a selection of at least one displayed communication identifier; instructions to determine a respective probability that an unselected communication identifier will be selected to be called together with the at least one displayed communication identifier; instructions to order the unselected communication identifiers based on the respective probabilities associated with respective unselected communication identifiers; and instructions to display the ordered unselected communication identifiers as another list.

According to still another aspect, a device is provided. The device may comprise means for initiating a communication with a communication device; means for logging the communications initiated with respective communication devices; means for determining a likelihood that any one of the communication devices will be a next communication device with which communication will be initiated based on the logged information; and means for ordering, in a displayable list based on the determined likelihoods, identifiers associated with at least two of the communication devices.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of the invention refers to the accompanying drawings. The same reference numbers in different drawings may identify the same or similar elements. Also, the following detailed description does not limit the invention.

The description to follow refers to a "call." As used herein, the term, call, is to be interpreted broadly, to include any type of communication, such as a voice call, a text message, a page, a fax transmission, an e-mail, an instant message, and the like, which may include a one-way, a two-way, or another type of communication among any number of parties.

Implementations described herein may be used to configure displayable call lists for easy number selection via a user interface, such as a keypad, on a device, such as a handheld communication device. Implementations described herein may use a call activity history, such as a "dialed calls" log, to effectively predict the numbers most likely to be called from the communication device. Implementations described herein may use log information, such as call frequency, time of day, day of the week, and combinations thereof to order a displayable call list corresponding to any given point in time. Implementations described herein may reconfigure the ordered call list when a first number is selected from the list according to the likelihood that any particular number may be also selected for pairing with the first selected number, for example, for conference calling or multi-recipient messaging.

Exemplary Communication Device

Figure 1:
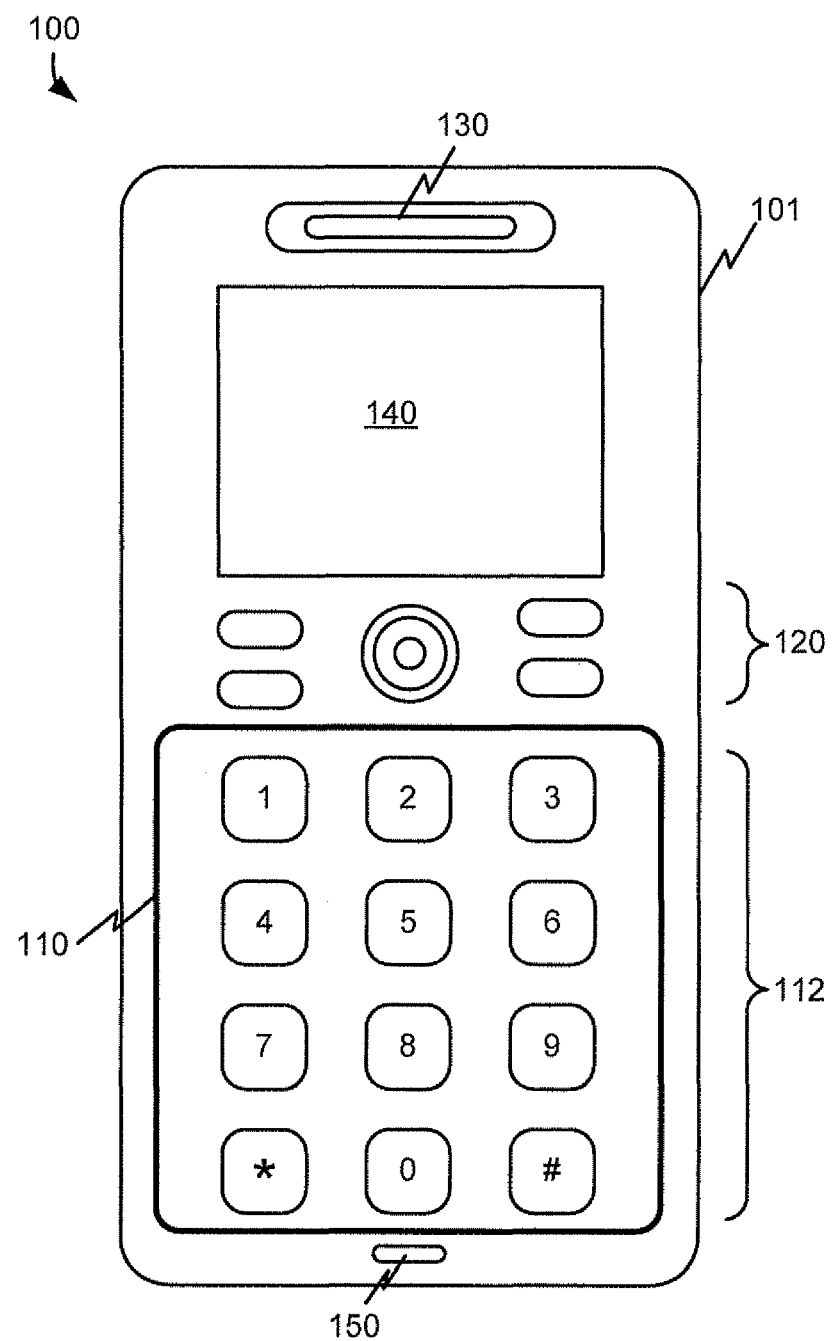
FIG. 1 is a diagram of an exemplary implementation of a communication device consistent with the principles of the invention.

FIG. 1 is a diagram of an exemplary implementation of a communication device consistent with the principles of the invention. Communication device 100 (hereinafter communication device 100) may be a mobile communication device. As used herein, a "communication device" and/or "communication terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; a laptop; a palmtop receiver and/or another type of communication device.

Communication device 100 may include housing 101, keypad 110, control keys 120, speaker 130, display 140, and microphone 150. Housing 101 may include a structure configured to hold devices and components used in communication device 100. For example, housing 101 may be formed from plastic, metal, or composite and may be configured to support keypad 110, control keys 120, speaker 130, display 140 and microphone 150.

Keypad 110 may include devices and/or logic that can be used to operate communication device 100. Keypad 110 may further be adapted to receive user inputs, directly or via other devices, such as a stylus for entering information into communication device 100. In one implementation, communication functions of communication device 100 may be controlled by activating keys 112. Implementations of keys 112 may have key information associated therewith, such as numbers, letters, symbols, etc. A user may interact with keys 112 to input key information into communication device 100. For example, a user may operate keys 112 to enter digits, commands, and/or text, into communication device 100. Designated functions of keys 112 may form and/or manipulate images that may be displayed on display 140.

Control keys 120 may include buttons that permit a user to interact with communication device 100 to cause communication device 100 to perform specified actions, such as to display a call list via display 140, scroll through the call list, select one or more of the displayed numbers on the list, place a call to the selected number, etc.

Speaker 130 may include a device that provides audible information to a user of communication device 100. Speaker 130 may be located anywhere on communication device 100 and may function, for example, as an earpiece when a user communicates using communication device 100. Speaker 130 may also function as an output device for music and/or audio information associated with games and/or video images played on communication device 100.

Display 140 may include a device that provides visual images to a user. For example, display 140 may provide graphic information regarding incoming/outgoing calls, text messages, games, phonebooks, the current date/time, volume settings, etc., to a user of communication device 100. Implementations of display 140 may be implemented as black and white or color flat panel displays.

Microphone 150 may include a device that converts speech or other acoustic signals into electrical signals for use by communication device 100. Microphone 150 may be located anywhere on communication device 100 and may be configured, for example, to convert spoken words or phrases into electrical signals for use by communication device 100.

Figure 2:
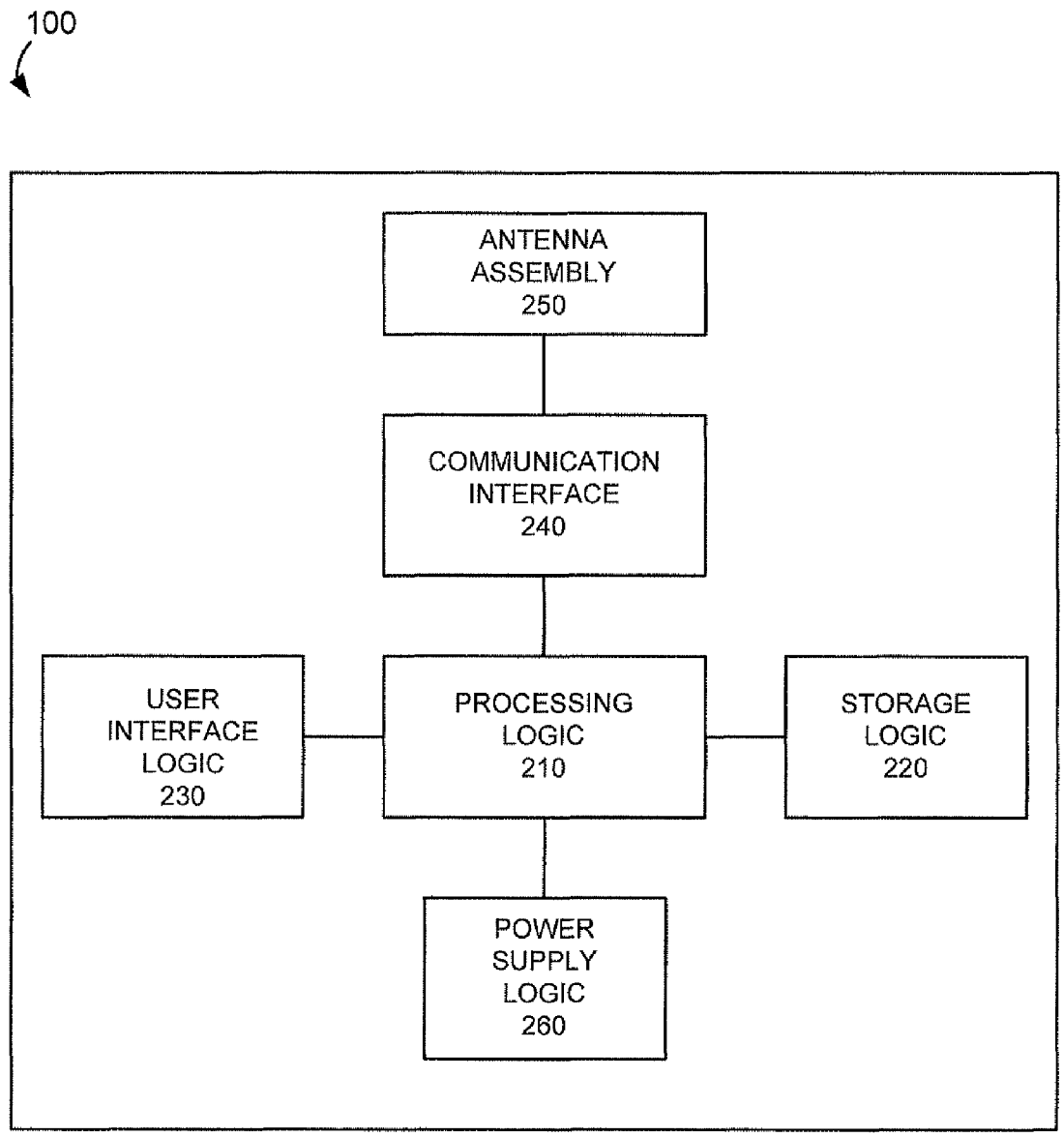
FIG. 2 illustrates an exemplary functional diagram of the communication device of FIG. 1 consistent with the principles of the invention.

FIG. 2 illustrates an exemplary functional diagram of a communication device, such as communication device 100, consistent with the principles of the invention. As shown in FIG. 2, communication device 100 may include processing logic 210, storage logic 220, user interface logic 230, communication interface 240, antenna assembly 250, and power supply logic 240.

Processing logic 210 may include a processor, microprocessor, an application specific integrated circuit (ASIC), field programmable gate array (FPGA), or the like. Processing logic 210 may include data structures or software programs to control operation of communication device 100 and its components. Implementations of communication device 100 may use an individual processing logic component or multiple processing logic components, such as processing logic components operating in parallel.

Storage logic 220 may include a random access memory (RAM), a read only memory (ROM), and/or another type of memory to store data and instructions that may be used by processing logic 210.

User interface logic 230 may include mechanisms, such as hardware and/or software, for inputting information to communication device 100 and/or for outputting information from communication device 100.

Communication interface 240 may include, for example, a transmitter that may convert base band signals from processing logic 210 to radio frequency (RF) signals and/or a receiver that may convert RF signals to base band signals. Alternatively, communication interface 240 may include a transceiver to perform functions of both a transmitter and a receiver. Communication interface 240 may connect to antenna assembly 250 for transmission and reception of the RF signals. Antenna assembly 250 may include one or more antennas to transmit and receive RF signals over the air. Antenna assembly 250 may receive RF signals from communication interface 240 for transmitting over the air, and receive RF signals over the air for conveying to communication interface 240.

Power supply logic 260 may include hardware and/or software to provide power to components of communication device 100. For example, power supply logic 260 may include one or more batteries and/or connections to receive power from other devices, such as an accessory outlet in an automobile, an external battery, or a wall outlet. Power supply logic 260 may include metering logic to provide the user and components of communication device 100 with information about battery charge levels, output levels, power faults, etc.

As will be described in detail below, communication device 100, consistent with the principles of the invention, may perform certain operations relating to dynamically configuring a displayable call list in response to user inputs and/or in response to instructions associated with processing logic 210. Communication device 100 may perform such operations in response to processing logic 210 executing software instructions of a call list configuration application contained in a computer-readable medium, such as storage logic 220. A computer-readable medium may be defined as a physical or logical memory device and/or carrier wave.

The software instructions may be read into storage logic 220 from another computer-readable medium or from another device via communication interface 240. The software instructions contained in storage logic 220 may cause processing logic 210 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Data Structure

Figure 3:
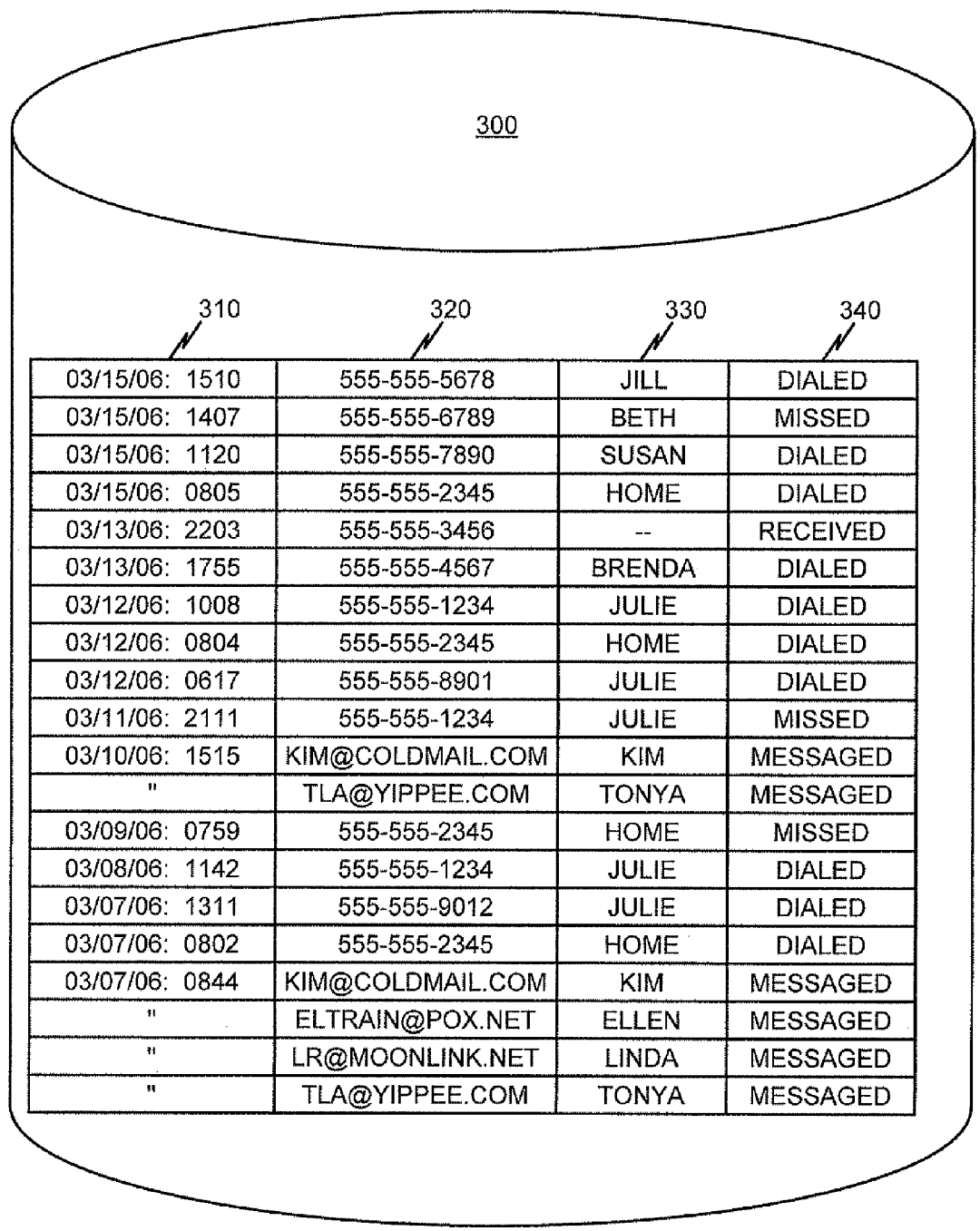
FIG. 3 illustrates an exemplary data structure consistent with the principles of the invention.

FIG. 3 illustrates an exemplary call log 300 consistent with the principles of the invention. Call log 300 may include a computer-readable medium that can be used to store information in a machine-readable format. In an exemplary implementation, call log 300 may store information that is used to form a displayable call list on display 140. In one implementation, call log 300 may be stored in storage logic 220.

Call log 300 may include a record of calls that are placed and received by communication device 100. The recorded information may be arranged in individual log entries (shown here as rows) in fields (shown here in columns), such as a date/time stamp field 310, a communication identifier field 320, an alias field 330, and a call type field 340. Call log 300 may include other fields, such as a call duration field, a location information field, a billing information field, and the like. Call log information in call log 300 may be arranged in any format.

Date/time stamp field 310 may include information that identifies a date associated with a call placed or received by communication device 100. Date/time stamp field 310 may include information that identifies a time of day associated with a call placed or received by communication device 100. Date and time information used for stamping calls may be generated by storage logic 220, processing logic 210, or another component in communication device 100.

Communication identifier field 320 may include information that identifies a communication device associated with a destination or a source of a call respectively placed or received by communication device 100. For, example, identifier field 320 may include information, such as a phone number, an e-mail address, etc., that uniquely identifies a communication device. In one implementation, communication interface 240, processing logic 210, or another component in communication device 100 may determine from an incoming call signal an identifier associated with a source communication device. For example, the identifier may be determined using automated number identification (ANI) or caller identity display (caller ID or CID) information associated with the received call.

Alias field 340 may include information that identifies a name of a party that may be associated with a communication identifier. In one implementation, the alias field may be automatically determined using CID information associated with a received call. In one implementation, a user may designate the name to be associated with the communication identifier, for example, in a phonebook, a contact list, or the like, for instance, using keys 112 and/or control keys 120. The entered information may be processed and/or stored by user interface logic 230, processing logic 210, storage logic 220, or another component in communication device 100. In one implementation, a single alias may be associated with more than one communication identifier, in which case the communication identifier may be associated with a further designation, such as a cell phone, a work phone, a home phone, an e-mail address, etc.

Call type field 350 may include information that identifies an aspect of the call, such as whether the call originated with communication device 100 (e.g., "dialed") or was terminated by communication device 100 (e.g., "received"), whether an incoming call was answered (e.g., "missed"), and the like.

Communication interface 240, processing logic 210, or another component in communication device 100 may identify the various aspects associated with a call.

Exemplary Processing

Figure 4:
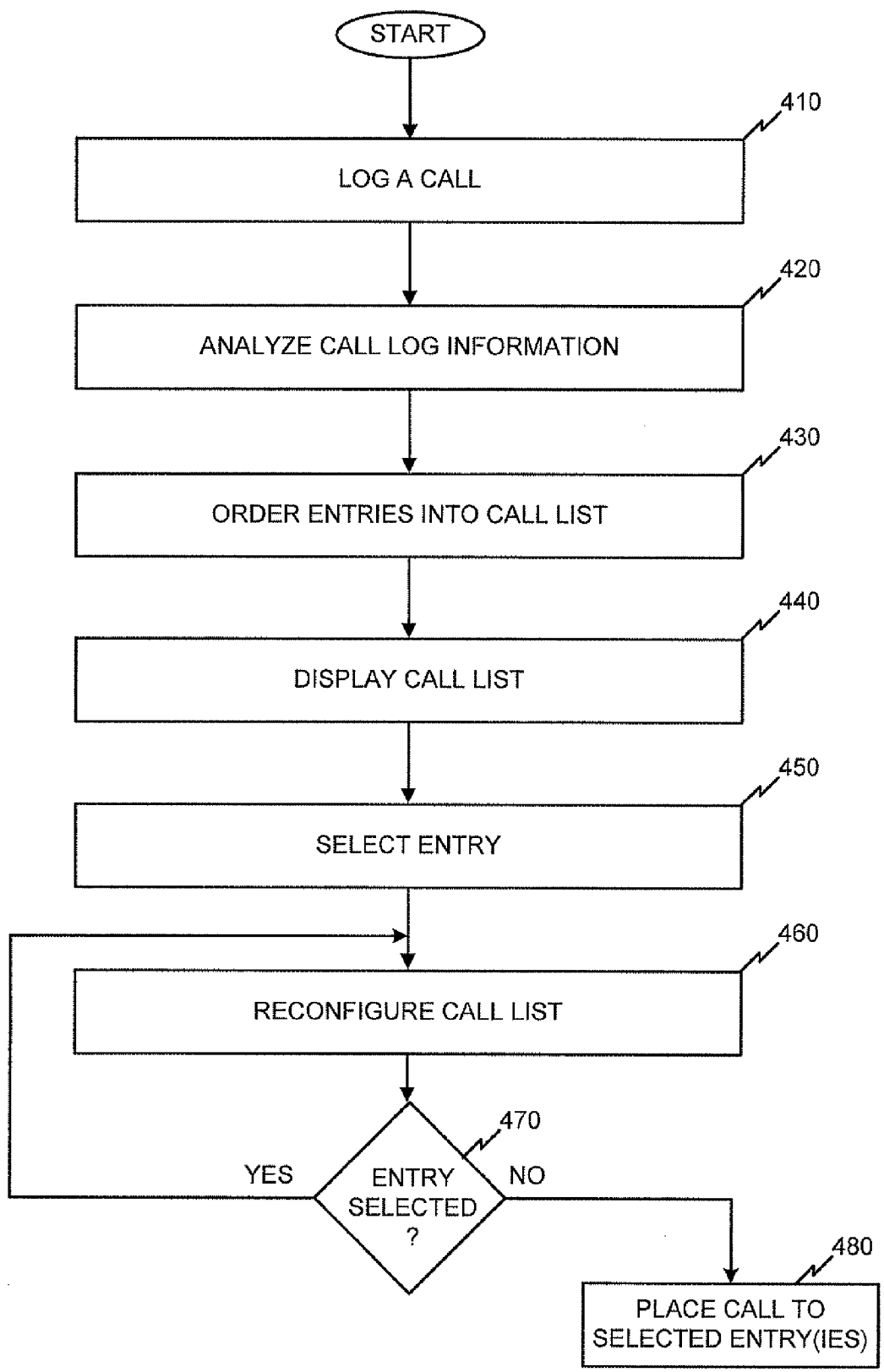
FIG. 4 illustrates an exemplary flow diagram of a call list configuration consistent with the principles of the invention.

FIG. 4 is a flowchart of an exemplary process consistent with the principles of the invention for implementing a call list configuration application. In one implementation, the call list configuration application may be operative in any mode of operation of communication device 100, for example, while "off," in "standby," during a call, etc.

Call log information may be obtained (act 410). A explained above, a log entry in call log 300 may be automatically generated and stored for an outgoing and/or incoming call, whether or not a communication line is established, i.e., the call is "answered." Logging of call activity may commence with initial operation of communication device 100 and be continuous thereafter. Logging of call activity may alternatively span any predetermined period. In one alternative implementation, call log information corresponding to call activity associated with communication device 100 may be maintained by a communications service provider associated with operation of communication device 100. Accordingly, call list configuration, as described below, may be accomplished, for example, at a server, and then provided to communication device 100.

Call list configuration, as described below, may be accomplished with at least one entry in call log 300. Call list configuration may begin with an analysis of one or more entries in call log 300 (act 420). In one implementation, the analysis may include a statistical analysis. The analysis may identify calling patterns associated with one or more of the communication identifiers in communication identifier field 320. In one implementation, the analysis may identify calling patterns associated with one or more of the aliases in aliases field 330, such that two or more communication identifiers associated with a single alias (e.g., cell, home, work, etc.) may be treated as a single communication identifier for purposes of the analysis.

In one implementation, the analysis may include all or any number of the entries in call log 300. For example, the analysis may be based on the type of call, as identified in call type field 340. In one implementation, the analysis may be based only on dialed calls. Alternatively, the analysis may include dialed calls, missed calls, and/or received calls. In one implementation, the analysis may be based only on calls during a predetermined period. That is, calls in call log 300 that are older than a predetermined amount of time may be discounted for purposes of the analysis. In one implementation, entries in call log 300 may be flushed from call log 300 based on a predetermined "age." Alternatively, the age of a call in call log 300 may be used as a weighting factor for purposes of the analysis. In another implementation, entries in call log 300 may be flushed from call log 300 based on a capacity of storage logic 220, for example, according to a first-in first-out practice or another technique.

Individual entries may be ordered in a call list based on the analysis (act 430). The order of the entries may be based on any number of criteria. In one implementation, the order may be based on frequency information associated with respective entries in call log 300, as determined by the analysis. For example, the call list order may be based on the number of entries in call log 300 corresponding to respective communication identifiers. A simplified example would be that the communication identifier that has been called the most from communication device 100 may be the first communication identifier listed on the call list, the communication identifier that has been called the next most from communication device 100 may be the next communication identifier listed on the call list, and so on. In one implementation, frequency ordering may be based on an absolute frequency, independent of recency. That is, the most frequently called communication identifier may be listed as first in the call list even when calls to any number of other communication identifiers have been made since the last call to the most frequently called communication identifier. Alternatively, ordering may be based on a combination of frequency and recency. For example, entries in call log 300 may be weighted according to any predetermined formula based on the recency in time associated therewith and frequency of the associated entries. In this manner, vintage calls, although frequent, may figure less prominently than recent calls, although fewer in number, in determining an order of the call list.

In one implementation, the configured call list order may be based on a time associated with the generation of the call list. For example, the ordering may be based on the analysis of call log information as it may relate to, for example, a time of day, a day of the week, a day of the month, etc. For example, the ordering may be dynamic throughout the course of a day, irrespective of call activity/inactivity occurring during that time. In one implementation, the analysis may identify a calling pattern associated with particular times of the day, days of the week, etc.

In one implementation, the configured call list order may be based on calendar information stored in communication device 100. That is, when a user has calendared information in a calendar application contained in communication device 100, the calendared information may automatically be considered as part of the analysis in call list configuration. For example, for calendar information such as a reminder, a birthday, a conference call, etc, having an alias and/or a communication identifier associated therewith, the associated alias and/or communication identifier may be prioritized in ordering, irrespective of other applied ordering criteria, such as frequency and/or recency. In one implementation, ordering based on calendared information may be used independently of, or, alternatively, in conjunction with ordering based recency information and/or frequency information.

The ordered call list may be displayed on display 140 (act 440). In one implementation, the call list may be passively displayed, for example, in a standby mode of communication device 100. In another implementation, the call list may be displayed when a user activates a designated key 112, control key 120, and/or another component in communication device 100. For example, the call list may be displayed when the user activates a send key during a standby mode. In one implementation, the call list is the "default" display.

The ordered entries in the call list may include any information. In one implementation, an ordered entry may include an alias, a communication identifier, a type of call associated with the entry (e.g., indicating whether the communication identifier was last called or last received), a communication identifier designation, such as "cell," "home," "work," etc. In one implementation, the ordered entries are displayed in respective lines. The call list may be displayed in other formats. The call list may be displayed a portion at time on display 140. That is, a limited number of entry lines may be displayed at once. In one implementation, a user may use keys 112, control keys 120, and/or another component in communication device 100 to display further portions of the call list. For example, the displayed call list may be scrolled or otherwise navigated using keys 112, control keys 120, and/or another component in communication device 100 and processed by user interface logic 230.

In one implementation, a user may interact with the call list using keys 112, control keys 120, or another component, for example, to scroll to a call list entry, and select the desired (e.g., highlighted) entry for calling (act 450). In one implementation, the selection of an entry of a displayed call list may cause a reconfiguration of the call list that includes the balance of the remaining (i.e., unselected) entries (act 460). For example, information from the analysis of the call log information may be used to determine an association between the communication identifier corresponding to the selected entry and one or more of the unselected communication identifiers. For example, the analysis may uncover instances when one or more of the unselected communication identifiers have previously been joint recipients of a multi-recipient text message or co-parties to a conference call. In one implementation, entries in the re-configured call list are ordered based on a degree of association (e.g., occurrences as joint recipients) with the selected entry.

A user may select an additional entry or discontinue the selection process (act 470). When a user makes a selection from the re-configured call list (i.e., selects a second communication identifier for communication), the re-configured call list itself can be re-configured based on an association between the communication identifier corresponding to the second selected entry and one or more of the unselected communication identifiers (act 460). The re-configuration process can be repeated in like manner for subsequently selected entries for a particular call.

When a user completes the selection process, a call may be placed to the communication identifiers associated with the selected entry or entries (and any communication identifiers, for example, entered manually), for example, by the user activating a send key (act 480). If a call includes a text message, the addressee list may be compiled in the manner discussed above (acts 410-470), before, during, or after the text message is composed, for example, using keys 112, control keys 120, and/or another component in communication device 100.

Any of the above ordering criteria may be applied to any degree, individually or in combination with one or more other criteria. In one implementation, the ordering criteria are programmable by a user of communication device 100, and may be changed accordingly. In another implementation, the ordering criteria, the call log information, and/or the call list configurations may be specific to a particular user of communication device 100, and/or a particular communication identifier associated with communication device 100. For example, two or more individual users of communication device 100 may be "logged in" as a distinct "current user" of communication device 100. As another example, calls may be placed from and/or received by communication device 100 via multiple assigned distinct communication identifiers. In either case, a call list configuration application consistent with principles of the invention, may be applied separately and associated with a specific user and/or a specific communication identifier.

EXAMPLES

FIGS. 5A-5G illustrate exemplary call list configurations generated from recorded call activity for communication device 100 for the period Mar. 7, 2006-Mar. 15, 2006 as reflected in call log 300, which are displayed, in part, on display 140 of communication device 100, consistent with the principles of the invention. As discussed above, the balance of the call list may be displayed corresponding to an input received from the user of communication device 100. The exemplary call list configurations may be generated, for example, by a statistical analysis of the logged call information performed by communication device 100. The statistical analysis may be used to determine, for example, a probability that respective communication identifiers in the call list are likely to be the next communication identifier to be called using communication device 100.

Figure 5A:
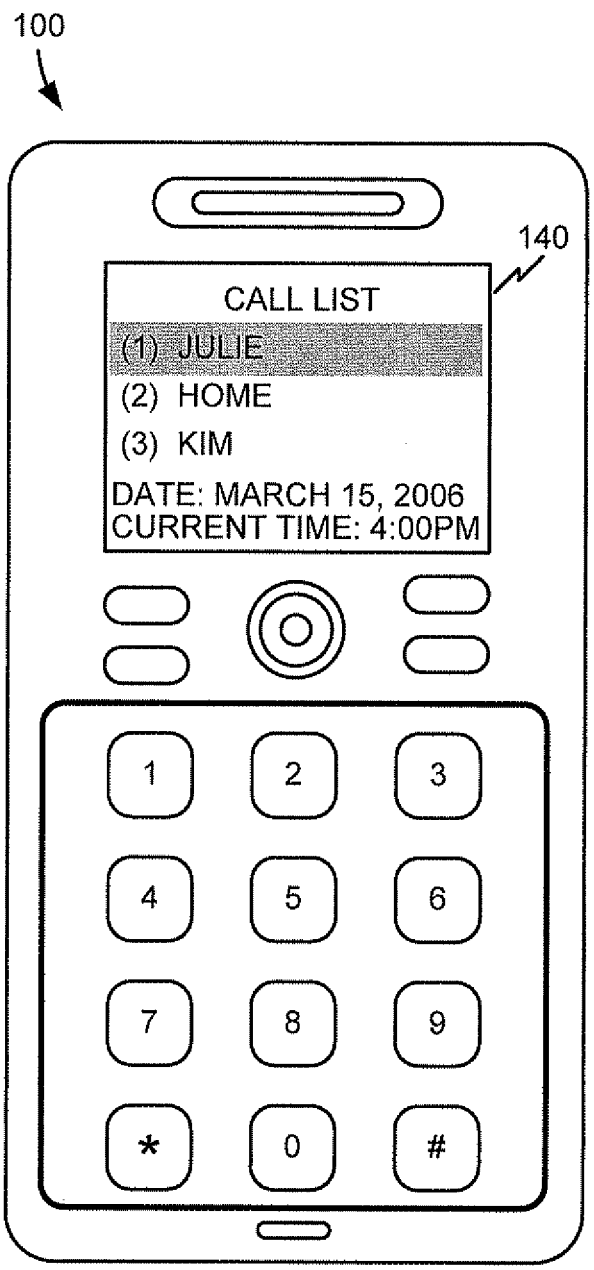
FIGS. 5A-G illustrate exemplary displayable call lists consistent with the principles of the invention.

FIG. 5A shows a display of a portion of a call list generated from call log 300, consistent with principles of the invention. The displayed call list in FIG. 5A may order "JULIE," "HOME," and "KIM," as entries 1, 2, and 3, respectively, for example, based on the number of times (i.e., relative frequency) a numbers associated with an alias has been called during the period of recorded call activity for communication device 100. As shown in FIG. 5A, two or more of the multiple communication identifiers associated with "JULIE" (i.e., 555-555-1234, 555-555-8901, 555-555-9012, etc.) may be considered as a single communication identifier for purposes of ordering the entries.

Figure 5B:
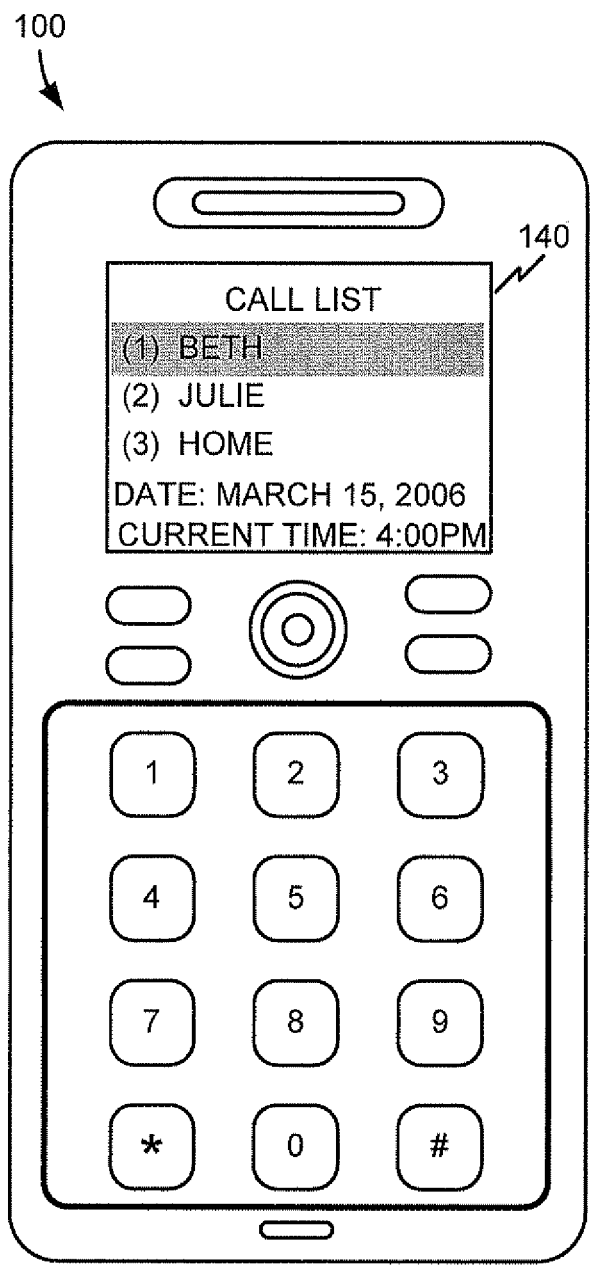

FIG. 5B shows another display of a portion of a call list generated from call log 300, consistent with principles of the invention. The displayed call list in FIG. 5B may order "BETH," "JULIE," and "HOME," as entries 1, 2, and 3, respectively, for example, based on relative frequency, and on BETH being a "MISSED" call, which may accorded priority (here, vis-à-vis all other entries shown in FIG. 5B) for purposes of ordering. In one implementation, priority accorded to a MISSED call may be removed once a call has been placed (i.e., returned) to the MISSED call, and/or based on an input received from a user of communication device 100.

Figure 5C:
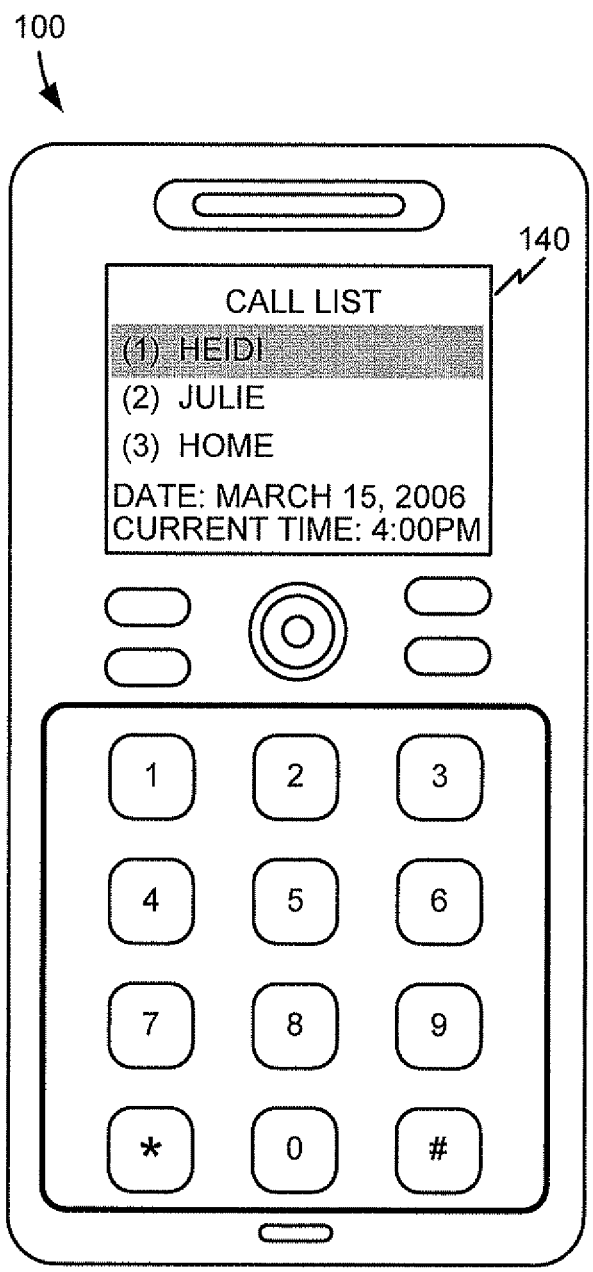

FIG. 5C shows another display of a portion of a call list generated from call log 300, consistent with principles of the invention. The displayed call list in FIG. 5C may order "HEIDI," "JULIE," and "HOME," as entries 1, 2, and 3, respectively, for example, based on relative frequency, and on HEIDI being calendared information (e.g., birthday), which may be accorded priority (here, vis-à-vis all other entries shown in FIG. 5C) for purposes of ordering. In one implementation, priority accorded to calendared information may be removed once a call has been placed to the communication identifier associated with the calendared information, and/or based on an input received from a user of communication device 100.

Figure 5D:
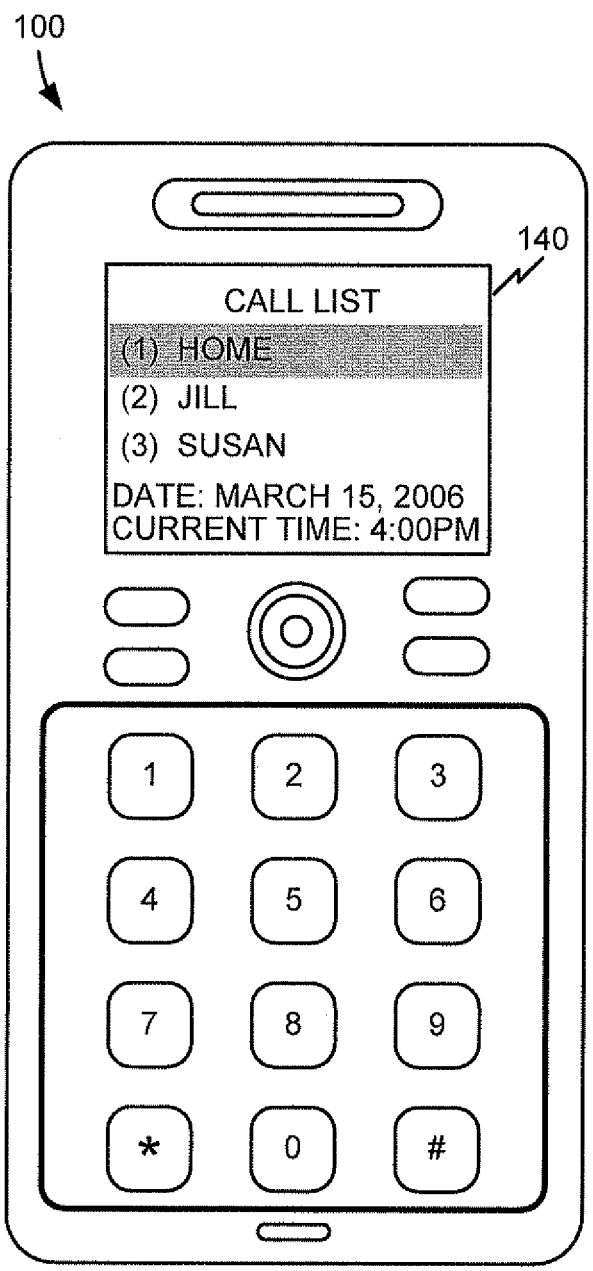

FIG. 5D shows another display of a portion of a call list generated from call log 300, consistent with principles of the invention. The displayed call list in FIG. 5D may order "HOME," "JILL," and "SUSAN," as entries 1, 2, and 3, respectively, for example, based on relative frequency, and the recency of the entries, such that the "age" of a call is weighting factor for purposes of ordering.

Figure 5E:
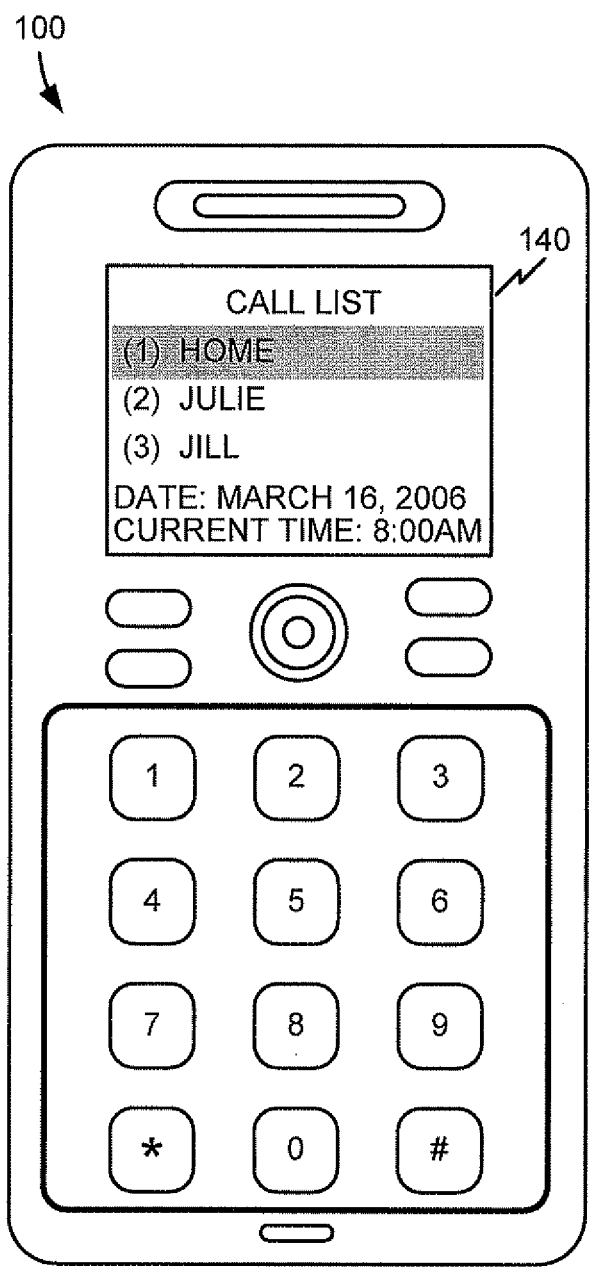

FIG. 5E shows another display of a portion of a call list generated from call log 300, consistent with principles of the invention. The displayed call list in FIG. 5E may order "HOME," "JULIE," and "JILL," as entries 1, 2, and 3, respectively, for example, based on relative frequency, and the time of day, i.e., "8:00 AM." That is, an analysis of call log 300 may have identified a pattern whereby a call is recurringly placed to HOME at approximately 8:00 AM day, such that HOME may be disproportionately counted (here, vis-à-vis JILL) for purposes of ordering. In one implementation, priority weighting based on time-of-day may be removed once a call has been placed to the corresponding communication identifier, or the window of time passes. The window of time for applying the time-of-day priority weighting may be any predetermined period and need not be bounded by the extreme times (shown as 7:59 and 8:05 AM in FIG. 5E) in the identified pattern. For example, the window here may extend between 7:00 and 9:00 AM, during which HOME may be accorded priority in ordering entries in the configured call list.

Figure 5F:
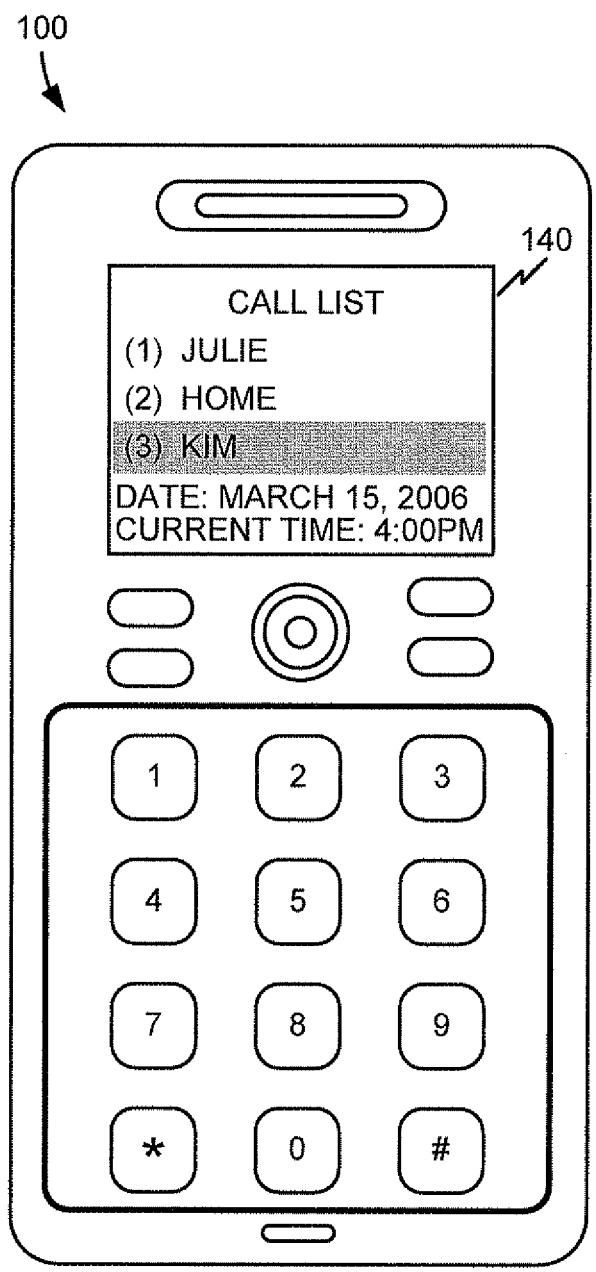
Figure 5G:
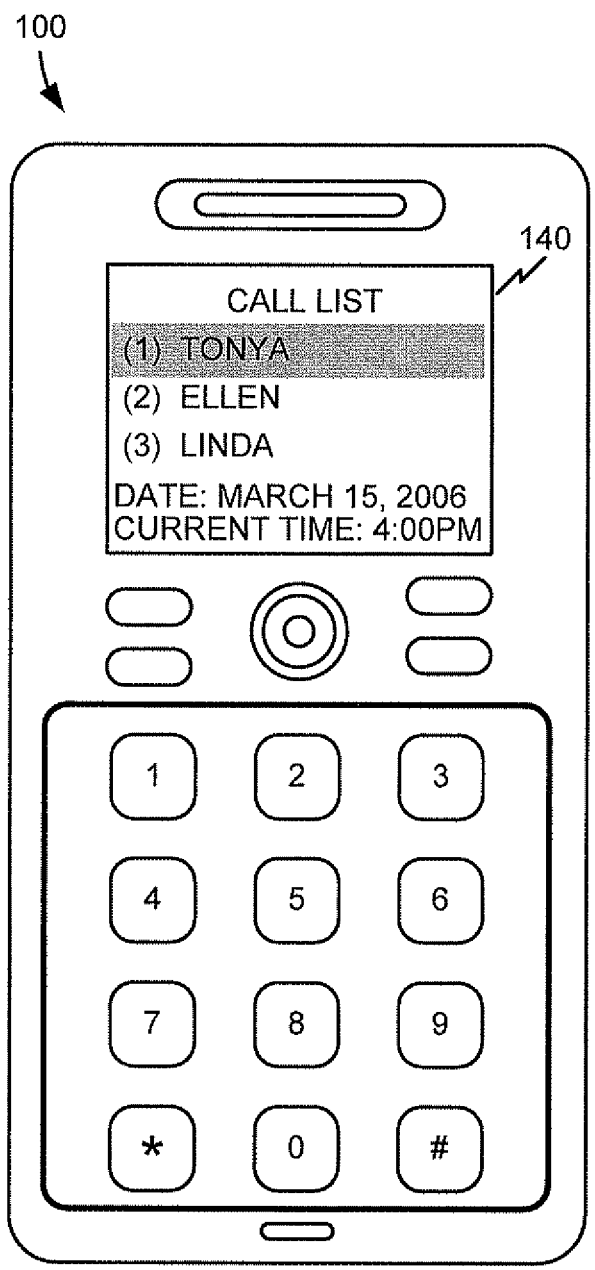

FIG. 5F shows the call list of FIG. 5A in which entry (3) "KIM" may have been highlighted for selection by a user of communication device 100, for example, after scrolling "down" the call list via entries (1) and (2). In one implementation, once highlighted, KIM may be selected by receiving an input from the user, for example, via the keys 112 and/or control keys 120. FIG. 5G shows a secondary call list that may be generated based on the selection of KIM from the call list of FIG. 5F. The derivative call list shown in FIG. 5C may be based on relative frequency, and an identified degree of association with the previously selected entry, i.e., KIM, for example, corresponding to multi-recipient text messages sent on Mar. 10 and Mar. 7, 2006.

CONCLUSION

Implementations consistent with principles of the invention may provide smart call list configuration that produces a displayable call list to a user of a communication device that may optimally order entries based on a determined likelihood that any particular number will be the next to be called.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts has been described with regard to FIG. 4, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A communication device comprising:
a memory to store a first call log including a plurality of communication identifiers corresponding to a plurality of party identifiers related to call activity of the communication device, wherein at least two of the plurality of communication identifiers correspond to a single party identifier of the plurality of party identifiers;
logic configured to generate, based on the first call log, a first call list including a first set of party identifiers, of the plurality of party identifiers, arranged in an order based on call frequency information respectively associated with the first set of party identifiers, wherein the first set of party identifiers includes the single party identifier, and the call frequency information for the single party identifier includes the call activity related to each of the at least two of the plurality of communication identifiers; and
a display to display at least a portion of the first call list.

2. The communication device of claim 1, wherein the call frequency information corresponds to at least one of time of day information or day of week information.

3. The communication device of claim 1, further comprising:
a calendar to store calendar information, wherein the order is further based on the stored calendar information.

4. The communication device of claim 1, further comprising:
a user interface, the displayed party identifiers being selectable via the user interface, the logic being further configured to generate a second call list based on a first selected one of the party identifiers.

5. The communication device of claim 4, wherein the second call list includes a second set of party identifiers associated with the first selected party identifier.

6. The communication device of claim 5, the second set of party identifiers being ordered based on a degree of association with the first selected party identifier.

7. The communication device of claim 5, when a second one of the party identifiers is selected from the second set of party identifiers, the logic is further configured to:
place a multi-party call to the first selected party identifier and the second selected party identifier.

8. The communication device of claim 1, the first call log and the first call list corresponding to a first user of the communication device, the memory to store a second call log, the logic further configured to generate a second call list based on the second call log, the second call log and the second call list corresponding to a second user of the communication device.

9. The communication device of claim 1, the first call log and the first call list corresponding to a first communication identifier associated with the communication device, the memory to store a second call log, the logic further configured to generate a second call list based on the second call log, the second call log and the second call list corresponding to a second communication identifier associated the communication device.

10. The communication device of claim 1, wherein the call frequency information includes weighted call frequency information based on call recency information.

11. A method comprising:
storing, in a memory of a communication device, communication identifiers associated with communications involving the communication device, wherein each of the stored communication identifiers corresponds to a party identifier of a plurality of party identifiers, wherein at least two of the stored communication identifiers correspond to a single party identifier of the plurality of party identifiers;
configuring a list of the plurality of party identifiers, including the single party identifier, based on a relative frequency of the communications involving each of the stored communication identifiers; and displaying at least a portion of the list.

12. The method of claim 11, wherein configuring the list is based on a time of day of the configuring.

13. The method of claim 11, wherein configuring the list is based on a day of week on which the list is configured.

14. The method of claim 11, further comprising:

calendaring information for a date, wherein configuring the list is further based on the calendared information associated with the date when the configuring occurs on the date.

15. The method of claim 11, further comprising:

receiving a first selection of a displayed communication identifier from the list;

reconfiguring the list based on the first selection; and displaying at least a portion of the reconfigured list.

16. The method of claim 15, further comprising:

receiving a second selection of a displayed communication identifier from the reconfigured list; and initiating a communication based on the first selection of the displayed communication identifier and the second selection of the displayed communication identifier.

17. The method of claim 15, further comprising:

determining a frequency with which the first selection is included in multi-party signal transmissions with two or more of the stored communication identifiers.

18. The method of claim 11, wherein configuring the list of the stored communication identifiers is further based on a relative recency of the communications involving the stored communication identifiers.

19. A non-transitory computer readable medium that stores instructions executable by a processing device operating in a communication terminal, the computer readable medium comprising;

instructions to determine a probability that a particular party identifier corresponding to at least two communication identifiers, of a plurality of communication identifiers stored in a memory of the communication terminal, will be selected for communication, by a user of the communication terminal, from a plurality of party identifiers corresponding to the stored communication identifiers, wherein the probability is based on past communications initiated to each of the at least two of the stored communication identifiers; and instructions to order at least two party identifiers, of the plurality of party identifiers, based on the probabilities determined for the at least two party identifiers, wherein the at least two party identifiers include the particular party identifier.

20. The non-transitory computer readable medium of claim 19, further comprising:

instructions to display the ordered communication identifiers as a list.

21. The non-transitory computer readable medium of claim 20, further comprising:

instructions to receive a selection of at least one displayed communication identifier;

instructions to determine a probability that an unselected communication identifier will be selected along with the at least one displayed communication identifier;

instructions to order the unselected communication identifiers based on the probabilities associated with the unselected communication identifiers; and instructions to display the ordered unselected communication identifiers as another list.

22. A device, comprising:

means for initiating a communication to a particular party identifier, of a plurality of party identifiers, associated with a particular communication device of a plurality of communication devices corresponding to the particular party identifier;

means for logging the communication initiated to the particular party identifier;

means for determining a likelihood that the particular communication device will be a next communication device with which communication will be initiated based on the logged information; and means for ordering, in a displayable list based on the determined likelihood, the plurality of party identifiers.

* * * * *